United States Patent
Nguyen

(10) Patent No.: US 7,058,957 B1
(45) Date of Patent: Jun. 6, 2006

(54) CLUSTER EVENT NOTIFICATION SYSTEM

(75) Inventor: Vy Nguyen, Hayward, CA (US)

(73) Assignee: 3PARdata, Inc., Fremont, CA (US)

( * ) Notice: Subject to any disclaimer, the term of this patent is extended or adjusted under 35 U.S.C. 154(b) by 396 days.

(21) Appl. No.: 10/194,710

(22) Filed: Jul. 12, 2002

(51) Int. Cl.
*G06F 7/00* (2006.01)

(52) U.S. Cl. .............................. 719/318; 714/1; 714/2; 714/4; 714/100; 709/223

(58) Field of Classification Search ................ 719/318; 709/223; 714/1–10, 100
See application file for complete search history.

(56) References Cited

U.S. PATENT DOCUMENTS

| | | | |
|---|---|---|---|
| 6,108,699 A | 8/2000 | Moiin | 709/221 |
| 6,493,716 B1 * | 12/2002 | Azagury et al. | 707/10 |
| 6,678,726 B1 * | 1/2004 | Moshaiov | 709/221 |
| 2001/0056461 A1 | 12/2001 | Kampe et al. | |
| 2002/0016867 A1 * | 2/2002 | Kampe et al. | 709/318 |
| 2002/0042693 A1 | 4/2002 | Kampe et al. | |
| 2002/0049845 A1 * | 4/2002 | Sreenivasan et al. | 709/226 |

OTHER PUBLICATIONS

Microsoft Message Queuing Services: A Guide to Reviewing Microsoft Message Queuing Service Release 1.0, Microsoft Corporation, Redmond, Washington, 1997.*

Windows 2000 Clustering Technologies: Cluster Service Architecture, White Paper, Microsoft Corporation, pp. 1-23.
Werner Vogels et al., "The Design and Architecture of the Microsoft Cluster Service", Paper, 10 pages.

* cited by examiner

*Primary Examiner*—William Thomson
*Assistant Examiner*—Qing-Yuan Wu
(74) *Attorney, Agent, or Firm*—Patent Law Group LLP; David C. Hsia

(57) ABSTRACT

A method for notifying events to a node in a cluster includes (1) receiving a first event message and a second event message, (2) queuing the first and the second event messages, (3) sending the first event message to a first service callback, wherein the first service callback calls a first callback function to handle the first event message, (4) sending the first event message to a second service callback after (a) the first service callback has handled the first event message and (b) a corresponding first service callback at a member node has handled the first event message, wherein the second service callback calls a second callback function to handle the first event message, and (5) sending the second event message to the first service callback after the first and the second callback functions have handled the first event message, wherein the first service callback calls the first callback function to handle the second event message. The method may further include sending a dummy message to the first callback function if the first callback function is waiting for a message from a sending node that is down. The method may also include sending a node down message to the first callback function if the first callback function is sending a message to a receiving node that is down.

5 Claims, 7 Drawing Sheets

CLUSTER EVENT NOTIFICATION SYSTEM

FIELD OF THE INVENTION

This invention relates to a utility storage server having multiple controller nodes, and more particularly to a cluster event notification system for each the controller nodes in a cluster.

DESCRIPTION OF RELATED ART

A utility storage server may be defined as any carrier-class storage system that supports multiple users or departments and provisions storage to multiple applications. The utility storage server may feature full fault-tolerance, security, and the ability to charge back individual users or departments for storage usage. To implement fault tolerance, a utility storage server uses clustering of multiple controller nodes to control many disk drives. Clustering is the use of two or more systems to work together to handle variable workloads or to provide continued operation in the event one fails. When a new node joins the cluster (commonly called a "node up event"), cluster software (e.g., an event system) updates the cluster services to the new controller node so the same services can be provided cluster wide. When a node in the cluster fails (commonly called a "node down event"), the cluster software fails over or takes over the cluster services for fault tolerance. These events may occur at substantially the same time so the cluster services need be able to handle them in parallel. However, it is difficult and complex to program cluster services that are able to handle events in parallel. Thus, what is needed is cluster software that allows cluster services to handle events in a simplified manner.

SUMMARY OF THE INVENTION

In one embodiment, a method for notifying events to a node in a cluster includes (1) receiving a first event message and a second event message, (2) queuing the first and the second event messages, (3) sending the first event message to a first service callback, wherein the first service callback calls a first callback function to handle the first event message, (4) sending the first event message to a second service callback after (a) a the first service callback has handled the first event message and (b) a corresponding first service callback at a member node has handled the first event message, wherein the second service callback calls a second callback function to handle the first event message, and (5) sending the second event message to the first service callback after the first and the second callback functions have handled the first event message, wherein the first service callback calls the first callback function to handle the second event message. In one embodiment, the method may further include sending a dummy message to the first callback function if the first callback function is waiting for a message from a sending node that is down. In one embodiment, the method may also include sending a node down message to the first callback function if the first callback function is sending a message to a receiving node that is down.

DETAILED DESCRIPTION

Figure 1A:
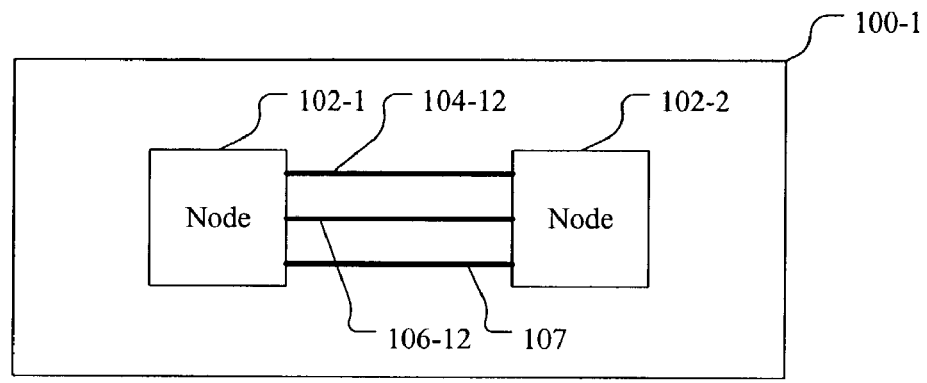
FIGS. 1A and 1B illustrate controller nodes of a utility storage server in two embodiments.

FIG. 1A illustrates controller nodes 102-1 and 102-2 of a utility storage server in one embodiment. Each controller node connects a host to a drive chassis housing hard disk drives. Nodes 102-1 and 102-2 can from a cluster 100-1 to provide disk access and failover protection. Controller nodes 102-1 and 102-2 are connected to each other by a primary link 104-12 and a backup link 106-12 in a one-to-one configuration. Controller nodes 102-1 and 102-2 are also connected by a serial bus 107 (e.g., an I2C bus). Each controller node is able to detect the power status (e.g., power on or power off) of any other node through primary link 104-12. Bach controller node is able to reset any other node (e.g., a cold reboot) through bus 107. For more information on the utility storage server, please see U.S. application Ser. No. 09/633,088, now U.S. Pat. No. 6,658,478, entitled "Data Storage System," and U.S. patent application Ser. No. 09/883,681, entitled "Node Controller For A Data Storage System," which are incorporated by reference in their entirety.

Figure 1B:
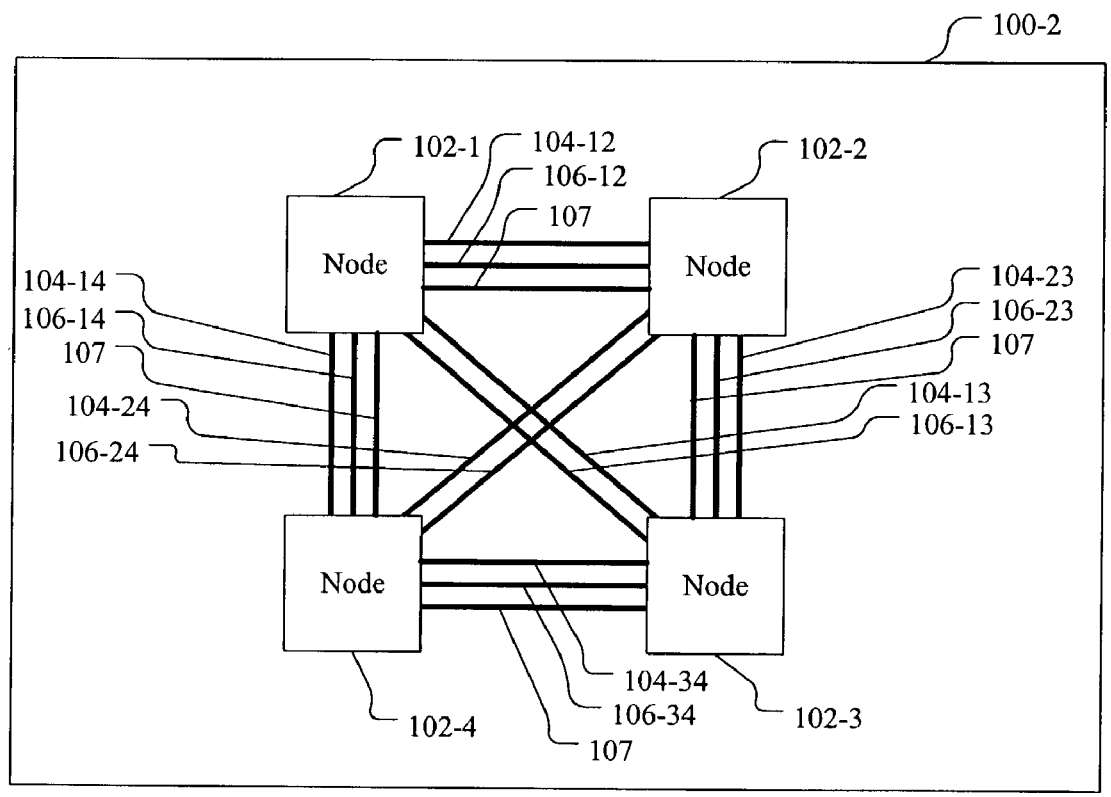

In other embodiments, the utility storage server contains a greater number of controller nodes that can form a cluster. For example, FIG. 1B illustrates four controller nodes 102-1, 102-2, 102-3, and 102-4 that form a cluster 100-2 in one embodiment. Each controller node is connected to the other controller nodes through primary and backup links in a one-to-one configuration. Specifically, (1) controller nodes 102-1 and 102-2 are connected by primary links 104-12 and backup link 106-12, (2) controller nodes 102-1 and 102-3 are connected by primary link 104-13 and backup link 106-13, (3) controller nodes 102-1 and 102-4 are connected by primary link 104-14 and backup link 106-14, (4) controller nodes 102-2 and 102-3 are connected by primary link 104-23 and backup link 106-23, (5) controller nodes 102-2 and 102-4 are connected by primary link 104-24 and backup link 106-24, and (6) controller nodes 102-3 and 102-4 are connected by primary link 104-34 and backup link 106-34. Additional, all the controller nodes are connected in series by bus 107. In another embodiment, the utility storage server contains eight controllers connected to each other through primary and backup links in a one-to-one configuration, and by bus 107 in a serial configuration.

Figure 1C:
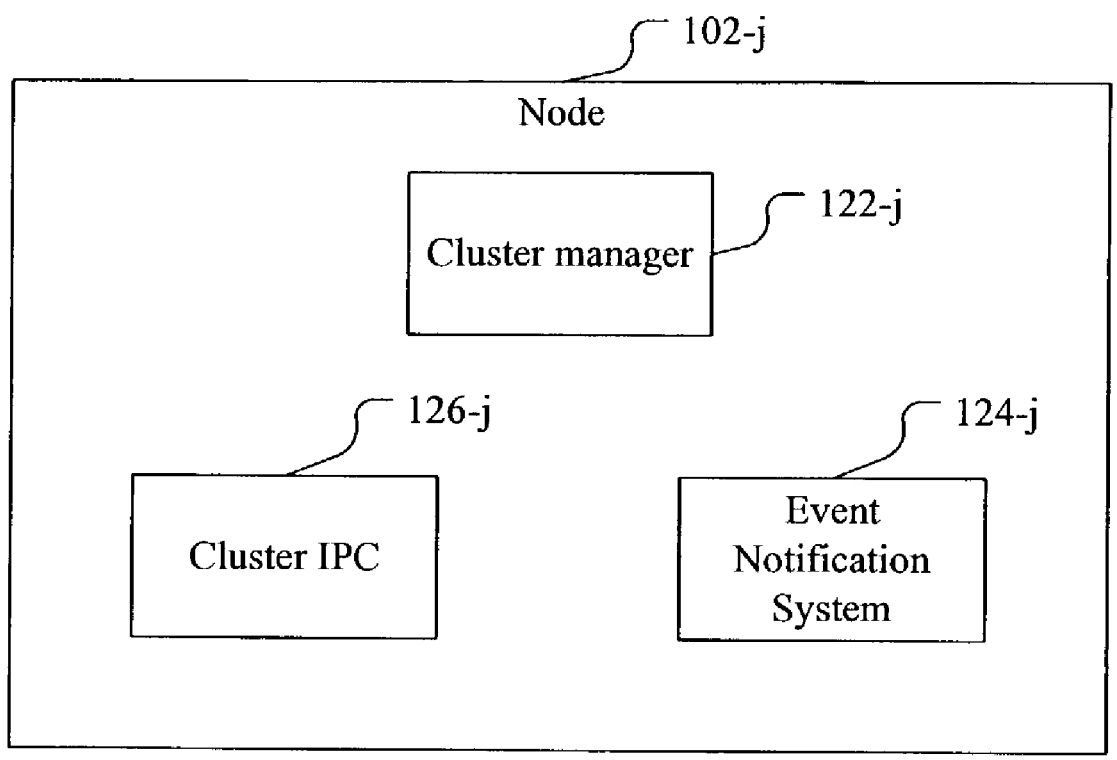
FIG. 1C illustrates cluster software in a controller node in one embodiment.

FIG. 1C illustrates cluster software on a controller node 102-j (where "j" is a variable) in one embodiment. The cluster software includes a cluster manager 122-j, a cluster event notification system 124-j, and a cluster inter-process communication (IPC) module 126-j. Cluster manager 122-j implements a protocol for new nodes to join a cluster of nodes. Cluster manager 122-j is described in detail in U.S. Pat. No. 6,965,957 titled "Automatic Cluster Join Protocol," which is incorporated by reference in its entirety. Cluster event notification system 124-j implements a protocol for a node to handle cluster events. Cluster event notification system 124-j is described in more detail below. IPC module 126-j implements a protocol for client-server process communication. IPC module 126-j is described in detail in U.S. patent application Ser. No. 10/194,606, entitled "Cluster Inter-Process Communication (IPC) Transport", which is incorporated by reference in its entirety.

Figure 2:
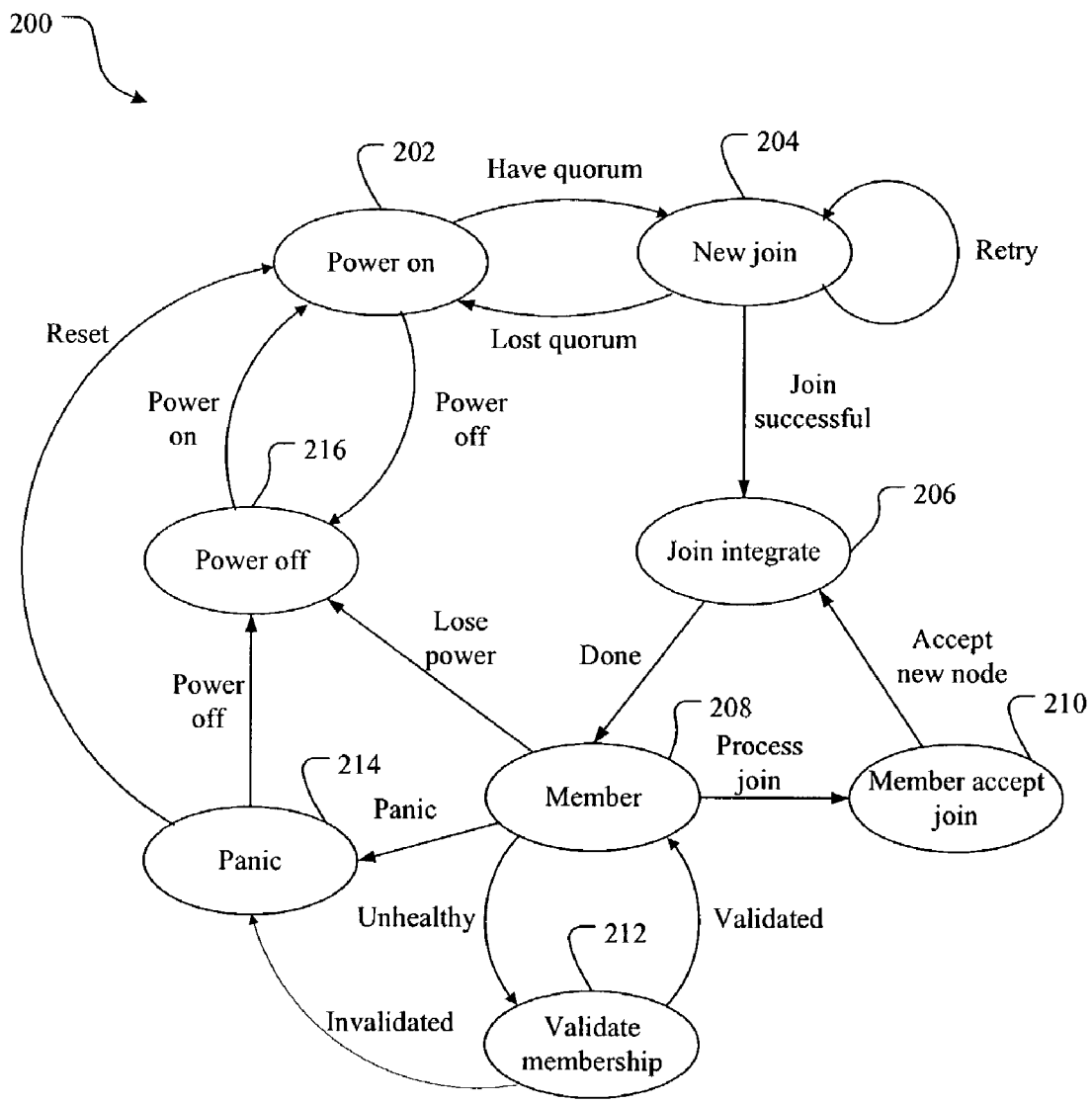
FIG. 2 illustrates a state diagram for each controller node to automatically join a cluster in a serial sequence in one embodiment.

FIG. 2 illustrates a state diagram 200 of each controller node 102-j under the control of cluster manager 122-j to automatically join a cluster 100-k (where "k" is a variable) in a serial sequence in one embodiment. State diagram 200 starts with node 102-j in state 202. In state 202, node 102-j powers on. If node 102-j has "quorum", then node 102-j advances to state 204. Quorum is defined as follows:

$$\text{quorum} = \text{number of primary link up} \geq \frac{\text{number of power on}}{2} + 1. \quad (1)$$

The number of primary link up indicates the number of other nodes that node 102-j can communicate with through their one-to-one primary links (after conventional setup such as handshaking and synchronization), including an internal link that node 102-j has to itself. The number of power on indicates the number of other nodes that node 102-j senses that are powered on through its primary link. Quorum is calculated with integer division where the fractional part (remainder) is discarded. If node 102-j loses power while in state 202, node 102-j advances to state 216.

In state 204, node 102-j attempts to join as a member of cluster 100-k. If node 102-j successfully joins cluster 100-k, node 102-j advances to state 206. If node 102-j does not successfully join cluster 100-k but does not lose quorum, node 102-j repeats its attempt to join as a member of cluster 100-k and stays in state 204. If node 102-j does not successfully join cluster 100-k and loses quorum, then node 102-j returns to state 202.

In state 206, node 102-j integrates into cluster 100-k. Integration is the conventional process in which node 102-j communicates with the other members to become a member of cluster 100-k. After node 102-j fully integrates into cluster 100-k, node 102-j advances to state 208. When a new node becomes part of cluster 100-k (e.g., a node up event), the cluster manager of each member node generates an event message to its event system. The event system then redistributes part of the cluster service provided by the member nodes to node 102-j.

In state 208, node 102-j is a member of cluster 100-k. If node 102-j receives a join request from a new node, then node 102-j advances to state 210. If node 102-j becomes "unhealthy", node 102-j advances to state 212. Node 102-j is unhealthy when it (1) cannot run an internal timer used to calculate timeouts, (2) cannot schedule a process (e.g., disk access), or (3) cannot communicate with the other member nodes. If node 102-j loses power in state 208, node 102-j advances to state 216. If node 102-j "panics", node 102-j advances to state 214. Node 102-j panics when the operating software (OS) of node 102-j has an error and fails to operate.

In state 210, node 102-j accepts the join request from the new node and advances to state 206 where node 102-j and the other member nodes integrate with the new node.

In state 212, node 102-j waits for the other member nodes to validate its membership. If node 102-j is validated by the other member nodes, node 102-j returns to state 208 where node 102-j remains as a member of cluster 100-k. If node 102-j is not validated by the other member nodes, node 102-j advances to state 214. When a node is no longer a part of cluster 100-k (e.g., a node down event), the cluster manager of each surviving member node generates an event message to its event system. The event system may redistribute the cluster service provided by node 102-j among the surviving member nodes.

In state 214, node 102-j has panicked and waits to be reset or powered off. The master node of cluster 100-k will reset node 102-j after a timeout period. After being reset, node 102-j advances to state 202. Alternatively, a human operator powers off node 102-j and node 102-j advances to state 216.

In state 216, node 102-j is without power. When power returns, node 102-j powers itself back on and returns to state 202.

Figure 3:
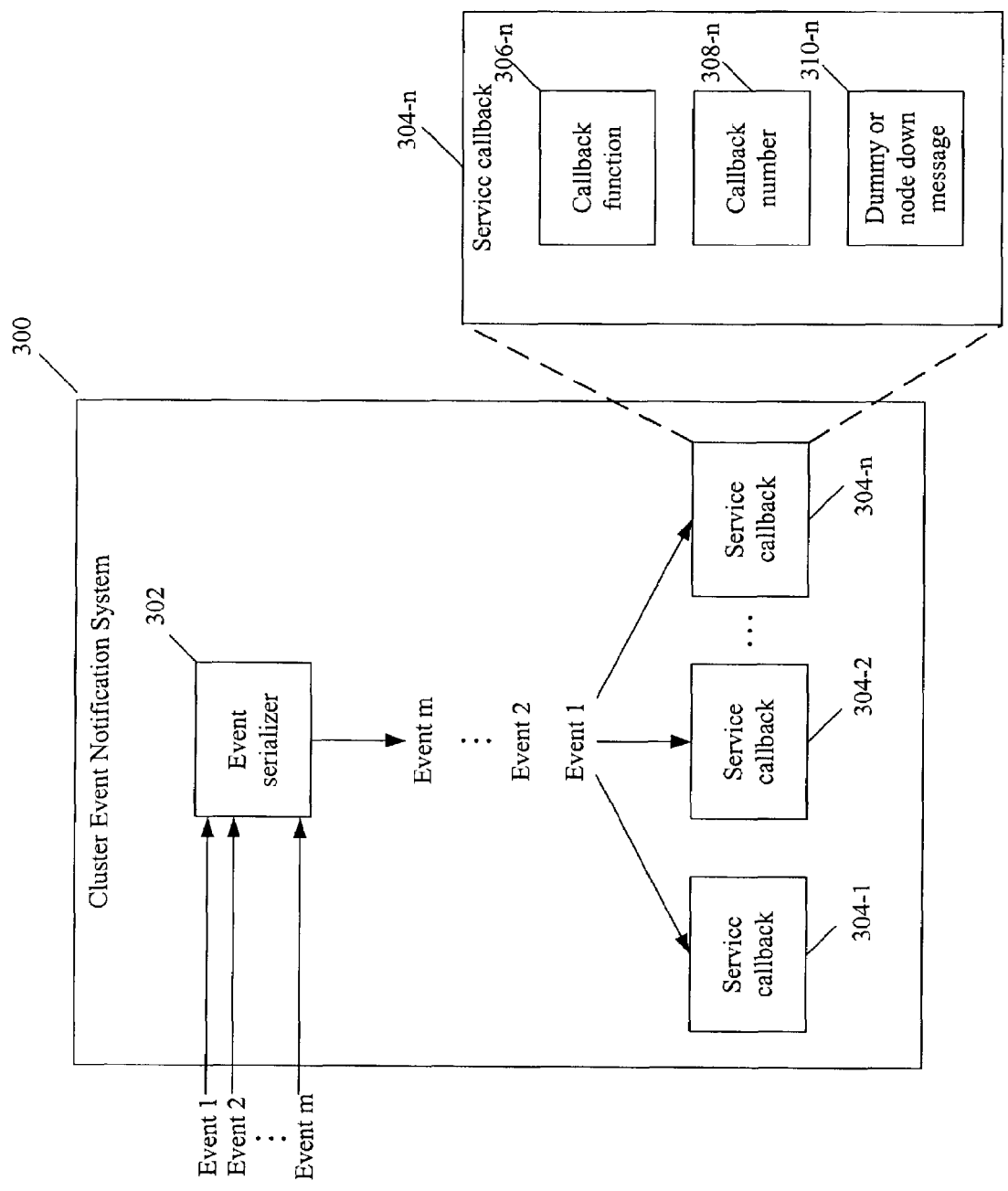
FIG. 3 illustrates a cluster event notification system in one of the controller nodes in one embodiment.

FIG. 3 illustrates a cluster event notification system 300 of a member node 102-j in one embodiment. System 300 handles cluster events in a serial sequence. System 300 includes an event serializer 302 and service callbacks 304-1 to 304-n (where "n" is a variable). In one embodiment, service callback 304-n includes a service callback function 306-n and a callback number 308-n. In one embodiment, service callback 304-n further includes a message 310-n. Message 310-n may be a dummy replay message or a node down message.

When there are cluster events that occur substantially at the same time, event serializer 302 queues event messages 1 to m (where "m" is a variable) from the cluster manager in a serial sequence. Event serializer 302 then sends one event message at a time to service callbacks 304-1 to 304-n. Event serializer 302 sends the event message to service callbacks 304-1 to 304-n in the order specified by their callback numbers 308-n.

Callback function 306 handles the cluster event according to the type of the event and the node that the event involves (e.g., node down, node 102-j). Serializer 302 may send a dummy reply or node down message 310-n to callback function 306-n when callback function 306-n is waiting for a message from, or has sent a message to, a member node that is currently down. Message 310-n allows callback function 306-n to process the cluster events in a serial sequence even though some cluster events occur in parallel. In one embodiment, callback function 306-n is a name mapping module in the cluster IPC module as described in related U.S. patent application Ser. No. 10/194,606, entitled "Cluster Inter-Process Communication (IPC) Transport,"

Figure 4:
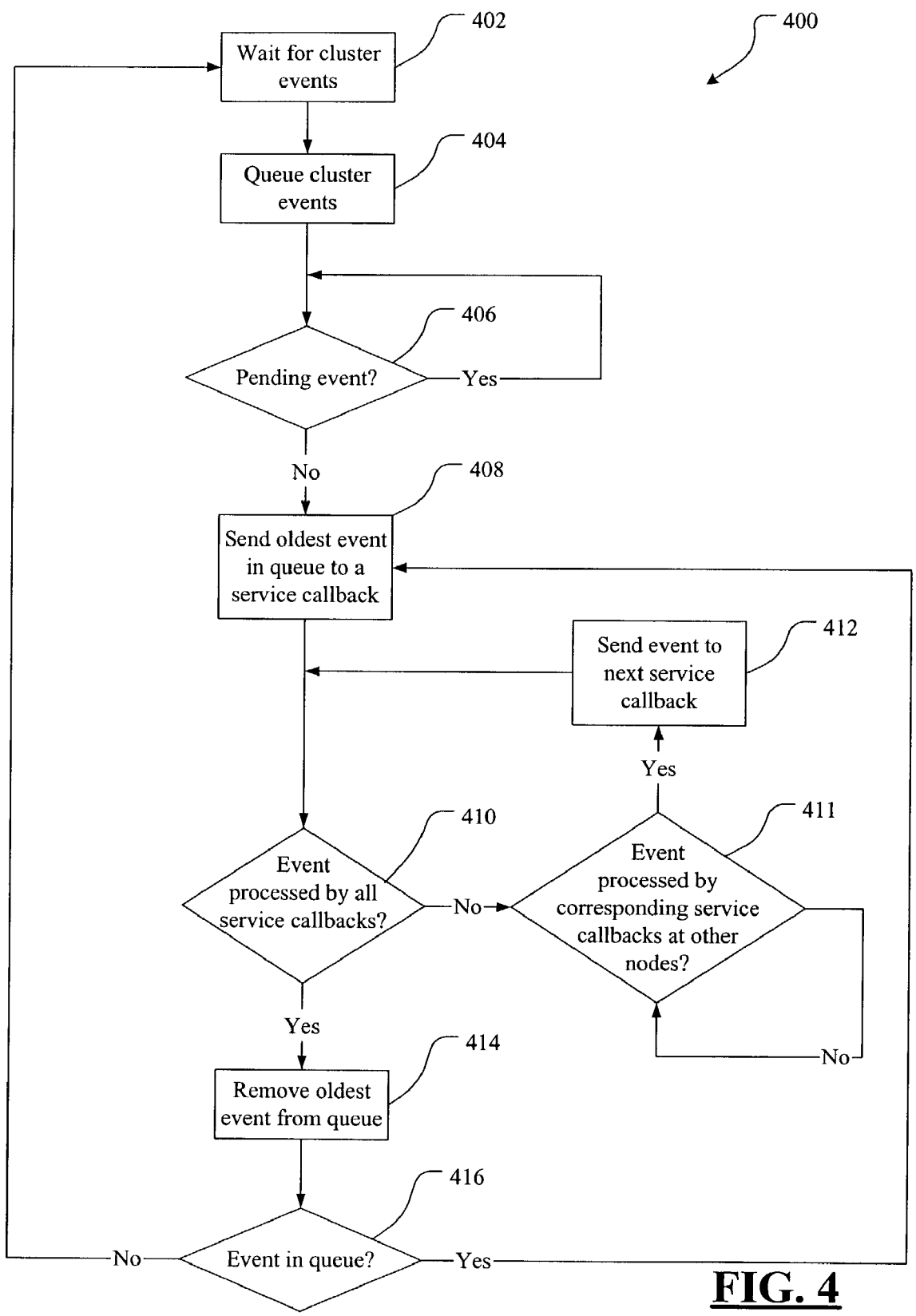
FIG. 4 illustrates a method of a serializer to queue simultaneous cluster events in one embodiment.

FIG. 4 illustrates a method 400 for serializer 302 to serialize cluster events in one embodiment. In action 402, serializer 302 waits to receive event messages 1 to m. Event messages 1 to m may arrive in any order because (1) cluster events may occur at substantially the same time, (2) one cluster event may also occur before another cluster event has been handled, and (3) a combination of (1) and (2).

In action 404, serializer 302 queues event messages 1 to m serially in memory. In action 406, serializer 302 determines if there is a pending event message that is being handled by callback function 306-n. If so, action 406 cycles until there is no longer a pending event message. If there is not a pending event message, action 406 is followed by action 408.

In action 408, serializer 302 sends one of event messages 1 to m to one of the service callbacks 304-1 to 304-n. In one embodiment, serializer 302 sends out the oldest event message because serializer 302 queues event messages 1 to m in a first in first out manner. For example, serializer 302 sends event message 1 in a first pass, event message 2 in a second pass, and so forth.

In one embodiment, serializer 302 sends the oldest event message to service callbacks 304-1 to 304-n in the order specified by their callback numbers 308. For example, serializer 302 sends event message 1 to callback service 304-1 in a first pass, to callback service 304-2 in a second pass, and so forth. Callback function 306-n handles the event according to the event type and the node involved. For example, callback function 306-n may redistribute the cluster service provided by member node 102-1 to member nodes 102-2 and 102-3 in response to a node 102-1 down event. Alternatively, callback function 306-n may partially distribute the service provided by the member nodes 102-2 and 102-3 to a new member node 102-4 in response to a node 102-4 up event. The exact actions of callback function 306-n in response to the event messages are application specific.

In action 410, serializer 302 determines if all the service callbacks 304-1 to 304-n have processed the event message. For example, serializer 302 determines if service callbacks 304-1 to 304-n have all processed event message 1 in a first pass. If not, action 410 is followed by action 411. If all the service callbacks have processed the event message, action 410 is followed by action 414.

In action 411, serializer 302 determines if corresponding service callbacks at the other member nodes have also processed the same cluster event. For example, after service callback 304-1 of node 102-1 has processed event message 1, serializer 302 determines if service callbacks 304-1 of member nodes 102-2 to 102-3 have also processed event message 1. If so, action 411 is followed by action 412. If not, action 411 cycles until the corresponding service callbacks at the other member nodes have processed the same event message.

In action 412, serializer 302 sends the event message to the next service callback specified by the order of the callback numbers 308-n. For example, serializer 302 sends event message 1 to service callback 304-2 in a first pass. Action 412 is followed by action 410 and the above steps cycle until all the service callbacks have processed the event message.

In action 414, serializer 302 removes the oldest event message from the queue. For example, serializer 302 removes event message 1 from the queue in a first pass.

In action 416, serializer 302 determines if there is any remaining event message in the queue. If so, action 414 is followed by action 408 where serializer 302 sends the oldest message in the queue (e.g., the next event message in the serial sequence) to a service callback. If there is not any remaining event message in the queue, action 414 is followed by action 402 and method 400 cycles as described above.

Figure 5:
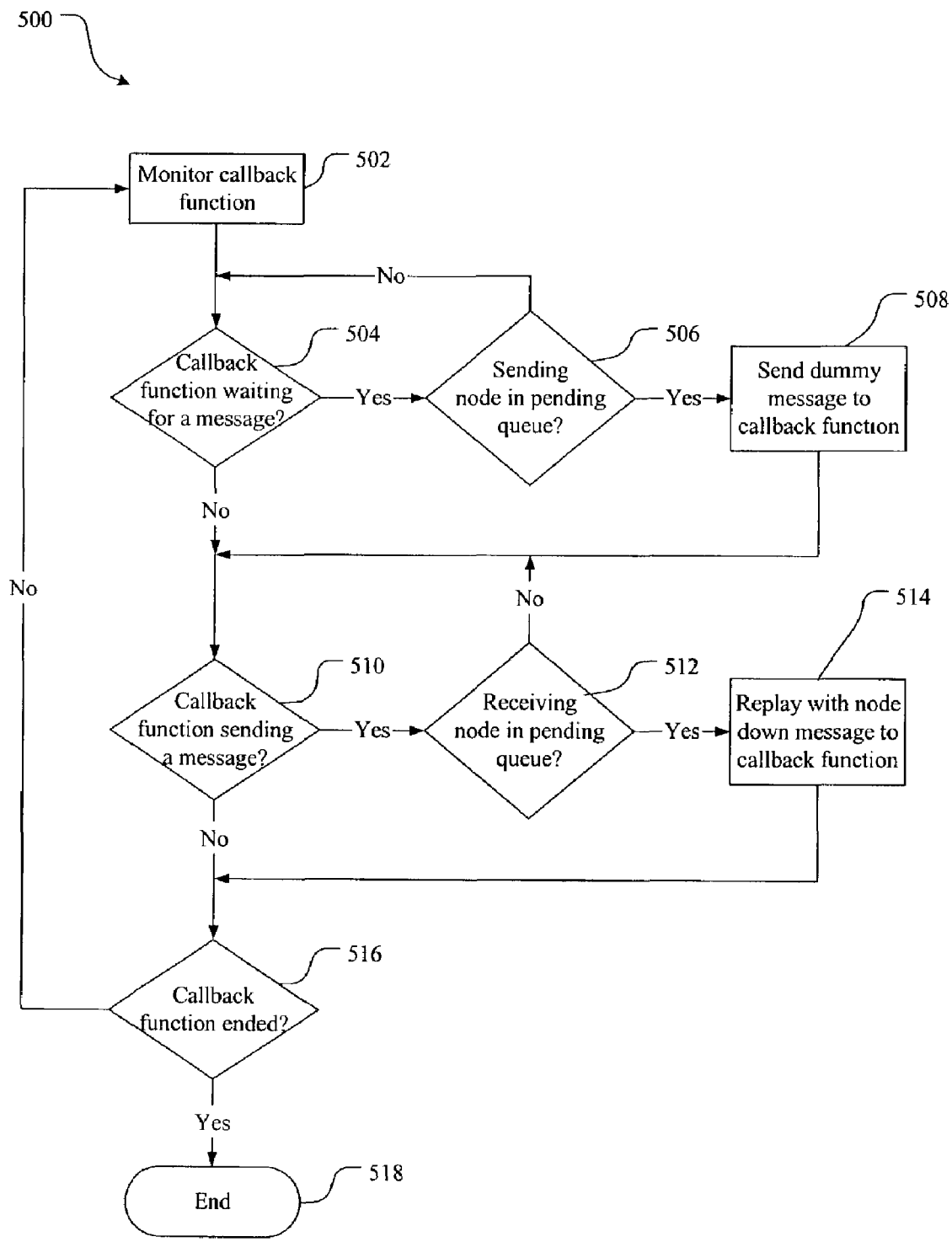
FIG. 5 illustrates a method of the serializer to send messages to service callbacks in one embodiment.

FIG. 5 illustrates the actions of serializer 302 in action 408 (FIG. 4) when callback function 306-n is handling an event message (e.g., event message m). In action 502, serializer 302 monitors callback function 306-n as callback function 306-n handles event message m. In action 504, serializer 302 determines if callback function 306-n is waiting for a message from another member node (hereafter "sending node"). If so, action 504 is followed by action 506. If callback function 306-n is not waiting for a message, action 504 is followed by action 510. Serializer 302 can determine if callback function 306-n is waiting for a message by determining if callback function 306-n has performed a listen call to receive a message.

In action 506, serializer 302 determines if one of node down events in the queue involves the sending node (i.e., the sending node is down). If the sending node is down, action 506 is followed by action 508. If not, action 506 is followed by action 504 and callback function 306-n continues to wait for the message from the sending node.

In action 508, serializer 302 sends a dummy message 310-n on behalf of the sending node to callback function 306-n. In response to dummy message 310-n, callback function 306-n can continue to handle event message m. Of course, dummy message 310-n does not contain any real data and therefore cannot be used in applications where callback function 306-n requires real data. Action 508 is followed by action 510.

In action 510, serializer 302 determines if callback function 306-n is sending a message to another member node (hereafter "receiving node"). If so, action 510 is followed by action 512. If callback function 306-n is not sending a message, action 510 is followed by action 516. Serializer 302 determines if callback function 306-n is sending a message by examining the outstanding messages at node 102-j before they are sent.

In action 512, serializer 302 determines if there is one of the node down events in the queue involves the receiving node (i.e., the receiving node is down). If so, action 512 is followed by action 514. If the receiving node is not down, action 512 is followed by action 510 and callback function 306-n continues to send the message.

In action 514, serializer 304 replies a node down message to callback function 306-n. This indicates to callback function 306-n that the receiving node is down. Action 514 is followed by action 516.

In action 516, serializer 302 determines if callback function 306-n has handled event message m. If not, action 516 is followed by action 502 and method 500 cycles through the actions above. If callback function 306-n has handled event message m, action 516 is followed by action 518 that ends method 500. Action 518 signals that this particular service callback has finished processing event message m and serializer 302 can send event message to the next service callback.

Figure 6:
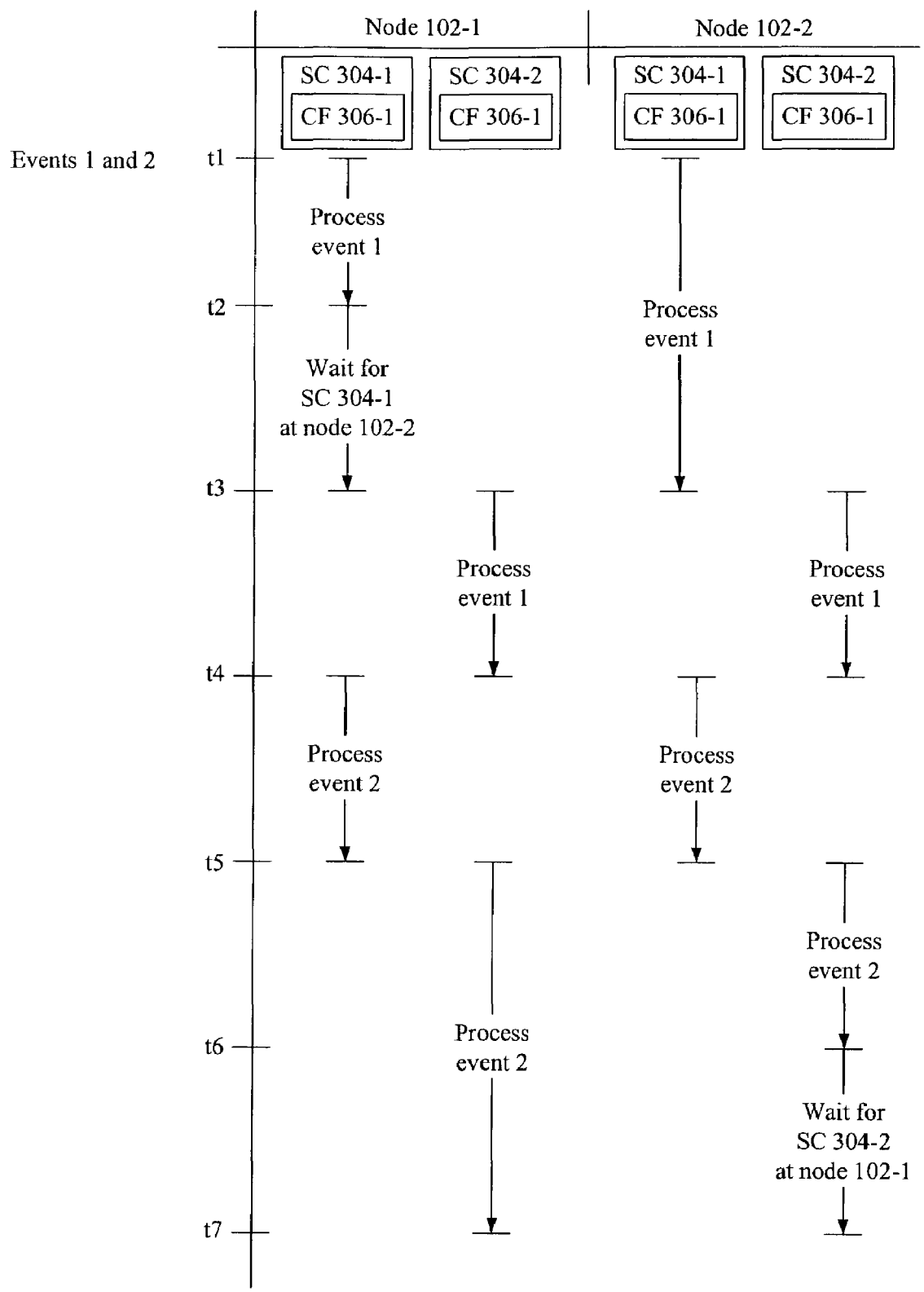
FIG. 6 illustrates a timing sequence using the cluster event notification system of FIG. 3 in one embodiment.

FIG. 6 illustrates an exemplary timing sequence using system 300 in one embodiment. In this example, a cluster 100-m includes two member nodes 102-1 and 102-2 that receive events 1 and 2 at substantially the same time. Each of member nodes 102-1 and 102-1 includes two service callbacks 304-1 and 304-2 (abbreviated as SC in FIG. 6). Service callbacks 304-1 and 304-2 respectively include callback functions 306-1 and 306-2 (abbreviated as CF in FIG. 6).

At time t1, systems 300 at nodes 102-1 and 102-2 receive event messages 1 and 2. As described above, serializers 302 at nodes 102-1 and 102-2 queue event messages 1 and 2 and then send event message 1 to service callbacks 3041. Service callbacks 304-1 at nodes 102-1 and 102-2 start to handle event message 1.

At time t2, service callback 304-1 (and more specifically callback function 306-1) at node 102-1 has handled event message 1 while service callback 304-1 (and more specifically callback function 306-1) at node 102-2 is still handling event message 1. Thus, serializer 302 at node 102-1 waits for service callback 304-1 at node 102-2 to finish in order to synchronize the timing of nodes 102-1 and 102-2.

As described above, serializer 302 at each of the nodes may be required to send a dummy or a node down message 310 to the callback functions if the callback function is waiting for a message from, or has sent a message to, a downed member node.

At time t3, both callbacks 304-1 at nodes 102-1 and 102-2 have handled event message 1. Accordingly, serializers 302 at nodes 102-1 and 102-2 send event message 1 to service callbacks 304-2. Service callbacks 304-2 at nodes 102-1 and 102-2 start to handle event message 1.

At time t4, both service callbacks 3042 at nodes 102-1 and 102-2 have handled event message 1. Accordingly, serializers 302 at nodes 102-1 and 102-2 send event message 2 to service callbacks 304-1. Service callbacks 304-1 at nodes 102-1 and 102-2 start to handle event message 2.

At time t5, both service callbacks 3041 at nodes 102-1 and 102-2 have handled event message 2. Accordingly, serializers 302 at nodes 102-1 and 102-2 send event message 2 to service callbacks 304-2. Service callbacks 304-2 at nodes 1.02-1 and 102-2 start to handle event message 2.

At time t6, service callback 304-2 (and more specifically callback function 306-2) at node 102-2 has handled event message 2 while service callback 304-2 (and more specifically callback function 306-2) at node 102-1 is still handling event message 2. Thus, serializer 302 at node 102-2 waits for service callback 304-2 at node 102-1 to finish in order to synchronize the timing of nodes 102-2 and 102-1.

At time t6, both callbacks 304-2 at nodes 102-1 and 102-2 have handled event message 2.

Various other adaptations and combinations of features of the embodiments disclosed are within the scope of the invention. Numerous embodiments are encompassed by the following claims.

What is claimed is:

1. A computer implemented method for notifying events in a node of a cluster, comprising:
    receiving a first and a second event messages;
    queuing the first and the second event messages;
    sending the first event message to a first service callback, wherein the first service callback calls a first callback function to handle the first event message;
    sending the first event message to a second service callback after (1) the first service callback has handled the first event message and (2) a corresponding first service callback at another node has handled the first event message, wherein the second service callback calls a second callback function to handle the first event message; and
    sending the second event message to the first service callback after the first and the second service callbacks have handled the first event message, wherein the first service callback calls the first callback function to handle the second event message.

2. The computer implemented method of claim 1, further comprising:
    sending a dummy message to the first callback function if the first callback function is waiting for a message from a sending node that is down.

3. The computer implemented method of claim 1, further comprising:
    determining if the first callback function is waiting for a message from a sending node;
    if the first callback function is waiting for a message, determining if there is an event message in queue indicating the sending node is down; and
    if there is an event message in queue indicating the sending node is down, sending a dummy message on behalf of sending node to the first callback function.

4. The computer implemented method of claim 1, further comprising:
    sending a node down message to the first callback function if the first callback function is sending a message to a receiving node that is down.

5. The computer implemented method of claim 1, further comprising:
    determining if the first callback function is sending a message to a receiving node;
    if the first callback function is sending a message to a receiving node, determining if there is an event message in queue indicating the receiving node is down; and
    if there is an event message in queue indicating the receiving node is down, sending a node down message to the first callback function.

* * * * *